(12) United States Patent
Kanai

(10) Patent No.: US 6,717,752 B2
(45) Date of Patent: Apr. 6, 2004

(54) IMAGE SEARCH DEVICE

(75) Inventor: Moriyasu Kanai, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/986,966

(22) Filed: Nov. 13, 2001

(65) Prior Publication Data
US 2002/0057496 A1 May 16, 2002

(30) Foreign Application Priority Data
Nov. 14, 2000 (JP) ........................................ 2000-346439

(51) Int. Cl.⁷ ................................................. G02B 7/02
(52) U.S. Cl. ........................ 359/814; 359/823; 359/813
(58) Field of Search ................................ 359/813, 814, 359/823, 831, 833–36, 656–661, 726, 733

(56) References Cited

U.S. PATENT DOCUMENTS

| | | | |
|---|---|---|---|
| 5,836,869 A | | 11/1998 | Kudo et al. .................. 600/173 |
| 6,086,531 A | * | 7/2000 | Tomioka et al. ............. 600/178 |
| 6,124,989 A | * | 9/2000 | Oode et al. .................. 359/729 |
| 6,201,646 B1 | * | 3/2001 | Togino et al. ............... 359/629 |

FOREIGN PATENT DOCUMENTS

| | | | |
|---|---|---|---|
| JP | 8-332169 | 12/1996 | ........... G02B/23/26 |
| JP | 10174673 | 6/1998 | ........... G02B/23/24 |

* cited by examiner

Primary Examiner—Jordan M. Schwartz
Assistant Examiner—Jessica Stultz
(74) Attorney, Agent, or Firm—Greenblum & Bernstein, P.L.C.

(57) ABSTRACT

An image separating device connected to a rigid endoscope has a Pechan prism to shift the optical axis of an objective optical system contained in the rigid endoscope, X- and Y-stages and a moving mechanism for moving the Pechan prism in a direction perpendicular to the optical axis of the objective optical system, and an enlarging optical system having an optical axis parallel with the optical axis of the objective optical system. As the Pechan prism is shifted, the image formed through the objective optical system is relatively shifted within its image plane, so that the image re-formed through a first image re-forming optical system is picked up by a first CCD camera without any decentering aberration, inclination relative to a direction perpendicular to the optical axis of the first image re-forming optical system, nor image rotation about the optical axis.

17 Claims, 9 Drawing Sheets

IMAGE SEARCH DEVICE

BACKGROUND OF THE INVENTION

1. Field of the Invention

The present invention relates to an image search device for allowing the observer to look at any desired area of an image formed through an objective optical system.

2. Description of the Related Art

An endoscopic apparatus of a certain type designed for medical applications is installed with an image search device that displays an enlarged view of a part of a wide angle image of an object formed through an objective optical system arranged at a distal end of the endoscope and allows the observer to search a target area to be observed within the wide angle image by shifting the enlarged view within the wide angle image.

Known endoscopic apparatus are so designed that the image pickup device is shifted in the enlarged image formed through the enlarging optical system vertically and horizontally or that the image formed through the objective optical system is shifted vertically and horizontally in the visual field of the enlarging optical system, so that the observer can search the target area to be enlarged and observed in the image formed through the objective optical system.

However, the endoscopic apparatus in which the image pickup device having a smaller image pickup area than the enlarged image formed through the enlarged optical system is shifted vertically and horizontally is inevitably made to have large dimensions, because the image pickup device needs a relatively large space where it can move inside the apparatus. On the other hand, with the endoscopic apparatus in which the image formed through the objective optical system is shifted by deflecting the object light coming from the objective optical system by means of a variable angle prism, decentering aberration occurs to the enlarged image, because of the relative decentering of the surfaces of the variable angle prism. Additionally, with the endoscopic apparatus in which the image formed through the objective optical system is shifted by rotating a pair of planar mirrors, the image plane formed through the objective optical system is inclined relative to a plane perpendicular to the optical axis of the enlarging optical system and the obtained image is rotated in the image plane.

SUMMARY OF THE INVENTION

One object of the present invention is to provide an image search device in which image formed through its objective optical system can be shifted relative to the visual field of its image re-forming optical system, in order to allow the observer to look at any desired area of the image formed through the objective optical system, in a plane perpendicular to the optical axis of the image re-forming optical system without producing any decentering aberration, inclination nor rotation of the image.

In present invention, the above object is achieved by providing an image search device with an objective optical system which forms an image of an object, an image erecting optical system having at least four reflection planes, a first image re-forming optical system to which object light having passed through the objective optical system and the image erecting optical system enters and which re-forms the image from the object light, and a drive mechanism which moves the image erecting optical system in a direction perpendicular to the optical axis of the objective optical system.

With this arrangement, as the image erecting optical system is moved by the drive mechanism, the position where the image is formed through the objective optical system is relatively shifted with the optical axis of the first image re-forming optical system in a direction perpendicular to the optical axis, while the image plane of the objective optical system is maintained to be perpendicular to the optical axis of the first image re-forming optical system. As a result, the image re-formed through the first image re-forming optical system does not carry any decentering aberration, inclination relative to a direction perpendicular to the optical axis of the first image re-forming optical system, nor rotation about the optical axis. "An image erecting optical system" means in this specification an optical system which inverts and reverse an image formed through the objective optical system or a relay optical system before the image erecting optical system itself. It is not necessary that the image formed after passing through the image erecting system has the same orientation as the object.

An image search device according to the invention may be incorporated into a rigid endoscope or a fiber scope or into a monitor camera.

The drive mechanism which moves the image erecting optical system may be manually operated or electrically powered.

The image erecting optical system of the image search device according to the invention may be a Pechan prism having a roof, an Abbe prism having a roof, a first type Porro prism, a second type Porro prism, a plurality of mirrors arranged at positions equivalent to the reflection planes of any one of such prisms or some other image erecting optical system having four or more reflection planes. In any case, the image formed through the objective optical system is relatively shifted within the image plane as the image erecting optical system is moved in a direction perpendicular to the optical axis of the objective optical system.

The image search device according to the invention may have a structure where the image formed through the objective optical system is re-formed only through the first image re-forming optical system, or a structure where object light coming from the objective optical system is separated into a light path passing through the first image re-forming optical system to re-form the image and into other light path passing through a second image re-forming optical system to re-form the image covering a different field of view than the image formed by the first image re-forming optical system. In case the image is re-formed only through the first image re-forming optical system, the image search device may additionally has an image pickup device which picks up the image formed through the first image re-forming optical system. On the other hand, in case the image is re-formed independently through the first and second image re-forming optical systems, the image search device may additionally has a first image pickup device which picks up the image formed through the first image re-forming optical system and a second image pickup device which picks up the image formed through the second image re-forming optical system.

A half mirror may be used to separate the object light coming from the objective optical system. If the image erecting optical system is formed by four reflection surfaces arranged at positions equivalent to those of a Porro prism, foremost one of the reflection planes may be made as the half mirror through which the object light passing through the reflection surface of the half mirror enters the second image re-forming optical system.

The present disclosure relates to subject matter contained in Japanese Patent Application No. 2000-346439 (filed on Nov. 14, 2000), which is expressly incorporated herein by reference in its entirety.

BRIEF DESCRIPTION OF THE DRAWINGS

The invention will be described below in detail with reference to accompanying drawings, in which.

DESCRIPTION OF THE PREFERRED EMBODIMENTS

Now, the present invention will be described by referring to the accompanying drawings that illustrate preferred embodiments of the invention.

First Embodiment

Figure 1:
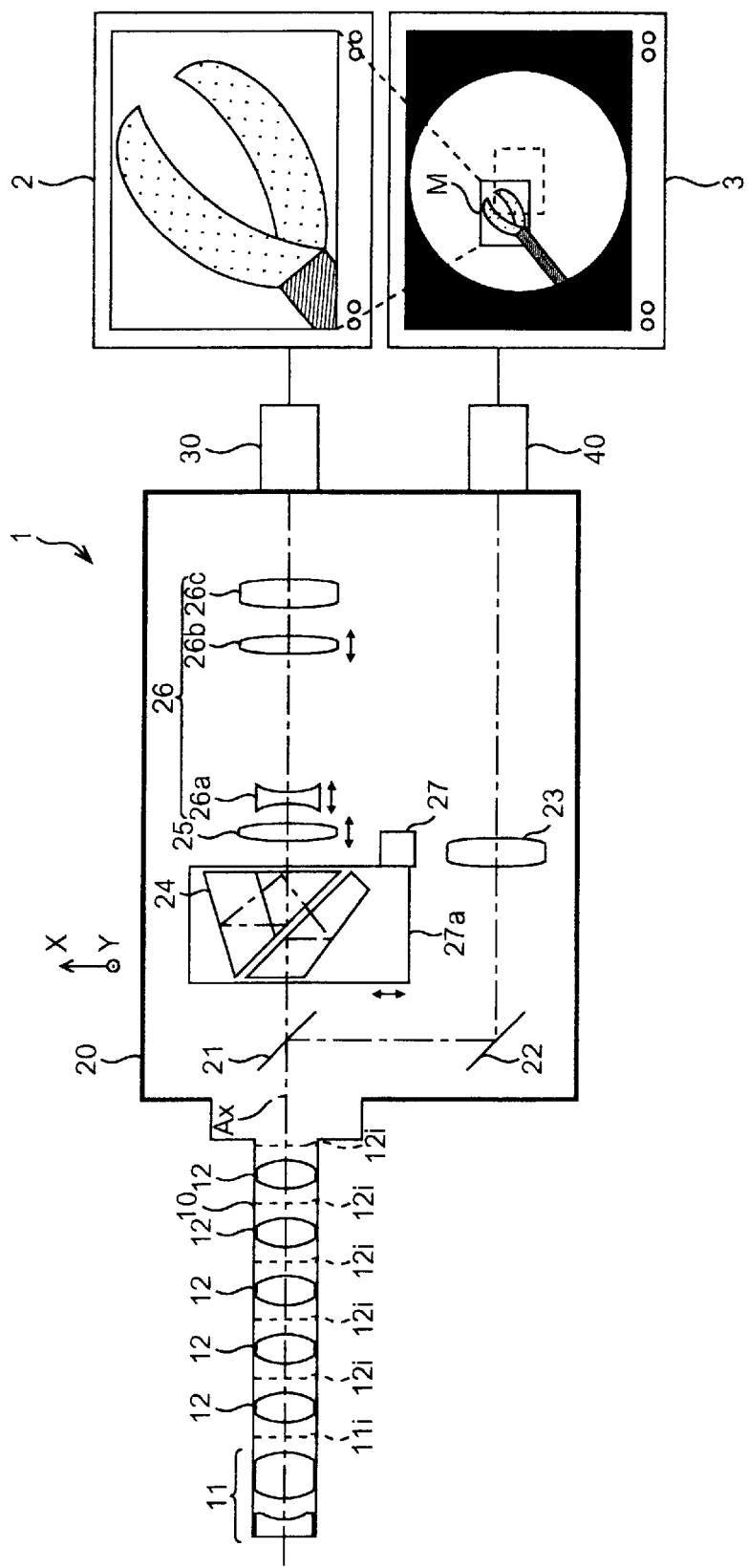
FIG. 1 is a schematic illustration of an optical arrangement and an internal arrangement of an endoscopic apparatus as a first embodiment of the invention.

A first embodiment of the image search device according to the invention is incorporated into an endoscopic apparatus 1. Referring to FIG. 1, the endoscopic apparatus 1 has a rigid endoscope 10 to be inserted into a body cavity through a trocar pierced up to the abdominal wall of the patient, an image separating device 20 to which the rigid endoscope 10 is connected and first and second CCD cameras 30, 40 functioning as image pickup devices for picking up respective images relayed through the optical system built in the image separating device 20.

Each of the first and second CCD cameras 30, 40 is adapted to pick up a moving image by means of an ordinary solid imaging device (CCD), converts the object light entering its image pickup surface into a video signal, process the obtained video signal appropriately and then output the video signal to each of first and second monitors 2, 3.

The rigid endoscope 10 has in its inside an objective optical system for forming an image of inside of the body cavity and relaying it, a light guide for guiding illumination light from a light source (not shown) to the distal end of the endoscope 10 in order to illuminate the body cavity, which are incorporated in a linear tube. The objective optical system has an objective lens group 11 and a plurality of relay lenses 12. The objective lens group 11 is a retro-focus type objective lens which can form an image of a wide view angle (e.g., more than 120°). The image of the body cavity is formed on the image plane 11i by the objective lens group 11. Then, the image formed on the image plane 11i is sequentially refocused on the image planes 12i of the respective relay lenses 12 until it is relayed to the image plane 12i of the last relay lens 12.

The image separating device 20 contains inside a half mirror 21, a reflection mirror 22, a Pechan prism 24, a focusing lens 25, a first image re-forming optical system including first through third lens groups 26a through 26c and a second image re-forming optical system 23 comprising a single positive lens. The half mirror 21 is arranged on the light path of the object light coming from the objective optical system in the rigid endoscope 10 to reflect part of the object light and to transmit the remaining part thereof. The reflection mirror 22 is arranged on the light path of the object light reflected by the half mirror 21. Thus, the optical axis Ax of the objective optical system is bent by the half mirror 21 and then bent again by the reflection mirror 22 to run along the optical axis of the second image re-forming optical system 23 and therefore perpendicularly strikes the center of the image pickup surface of the second CCD camera 40 connected to the image separating device 20.

With the above described arrangement, the object light reflected by the half mirror 21 is reflected again by the reflection mirror 22 and transmitted through the second image re-forming optical system 23 to enter the imaging surface of the second CCD camera 40. The second CCD camera 40 picks up the image formed by the objective optical system (comprising an objective lens group 11 and a plurality of relay lenses 12) arranged in the rigid endoscope 10 and relayed by the second image re-forming optical system 23 and outputs a video signal representing the picked up image. Then, the image is reproduced on the display screen of the second monitor 3 according to the video signal.

Figure 2:
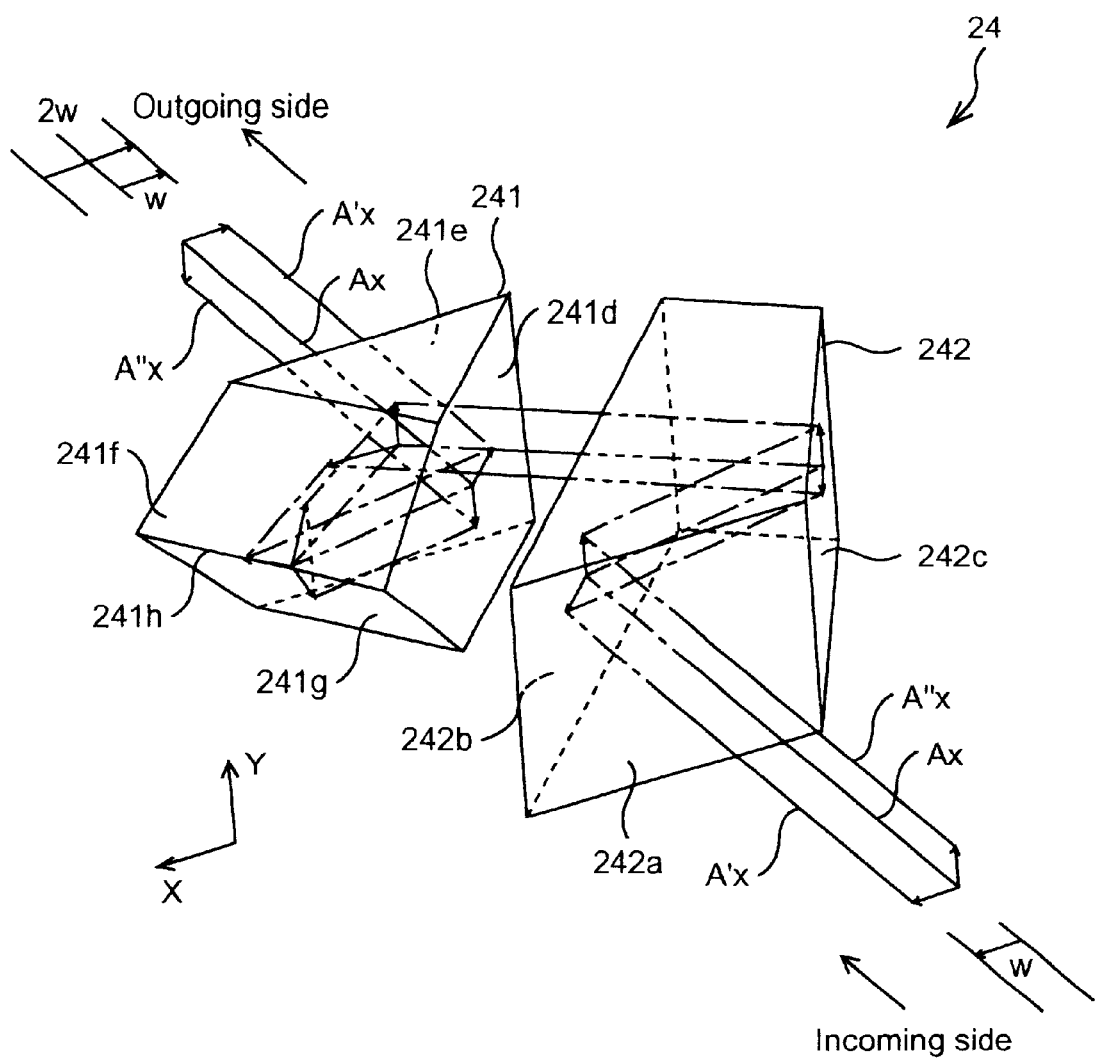
FIG. 2 is an enlarged perspective view of a Pechan prism that is used in the first embodiment.

On the other hand, the Pechan prism 24 functioning as an image erecting optical system is held on the light path of the object light transmitted through the half mirror 21 in such a way that it can be shifted in the X-direction that is perpendicular to the optical axis Ax of the objective optical system and also in the Y-direction that is perpendicular to both the X-direction and the optical axis Ax. FIG. 2 is a perspective view of the Pechan prism that is used in the first embodiment. As seen from FIGS. 1 and 2, the Pechan prism 24 consists of a roof prism 241 having a shape equivalent to a form where a side surface of a triangular prism is replaced by the roof consisting of surfaces 241f and 241g (with the ridge line 241h of the roof parallel with the bottom surface of the triangular prism) and an auxiliary prism 242 that is a quadratic prism having a side surface 242b parallel with a side surface of the roof prism 241. The optical axis Ax of the objective optical system having passed through the half mirror 21 enters perpendicularly into the auxiliary prism 242 of the Pechan prism 24 through its side surface 242a and bent twice by the inner surfaces of the two surfaces 242b, 242c of the auxiliary prism 242 located adjacent to the side surface 242a and passes perpendicularly through the side surface 242b of the auxiliary prism 242 and the side surface 241d of the roof prism 241. Thereafter, the optical axis Ax is bent sequentially by the inner surfaces of the side surface 241e, the roof surfaces 241f, 241g and the side surface 241d of the roof prism 241 and then exit from the roof prism 241 perpendicularly through the side surface 241e (in a direction parallel to the optical axis Ax before entering the auxiliary prism 242). Note that the extension of the optical axis Ax before entering the Pechan prism 24 runs through the center of the image pickup surface of the first CCD camera 30 connected to the image separating device 20. The position of the Pechan prism 24 at which the optical axis Ax before entering the Pechan prism 24 is coaxial with the optical axis Ax after exiting from the Pechan prism 24 is referred to as initial position of the Pechan prism 24 hereinafter.

The focusing lens 25 is arranged coaxial with the optical axis Ax of the objective optical system after exiting from the Pechan prism 24 in the initial position. The focusing lens 25 is movable along its optical axis. The focusing lens 25 is moved by a focusing actuator (not shown) typically being a DC servo motor or a stepping motor.

The first through third lens groups 26a through 26c of the first image re-forming optical system 26 are arranged between the focusing lens 25 and the first CCD camera 30 also coaxial with the optical axis Ax of the objective optical system after exiting from the Pechan prism 24 in the initial position. The third lens group 26c is fixed, while the first and second lens groups 26a, 26b are movable along their optical axes. Therefore, the first image re-forming optical system 26 can appropriately change its magnification and the first lens group 26a and/or the second lens group 26b correspond to a variator. The first and second lens groups 26a, 26b are moved by a zooming actuator typically being a DC servo motor or a stepping motor.

With the above described arrangement, the object light transmitted through the half mirror 21 is then sequentially transmitted through the Pechan prism 24, the focusing lens 25 and the first image re-forming optical system 26 before it enters the imaging surface of the first CCD camera 30. More specifically, the Pechan prism 24 inverts and reverses the image formed by the objective optical system (comprising the objective lens group 11 and the plurality of relay lenses 12) arranged in the rigid endoscope 10, and the first image re-forming optical system 26 enlarges a part of the image formed by the objective optical system with a predetermined magnification to re-form the image on the imaging surface of the first CCD camera 30. Then, the first CCD camera 30 picks up the image formed by the first image re-forming optical system 26 and outputs a video signal representing the picked up image. Thereafter, the image is displayed on the display screen of the first monitor 2 according to the video signal.

The Pechan prism 24 is movable within the XY-plane as X- and Y-stages 27a are driven by a moving mechanism 27. More specifically, the moving mechanism 27 includes a drive actuator typically being a DC servo motor or a stepping motor and a gear system for transmitting the drive force of the drive actuator to each of the X- and Y-stages so that the X- and Y-stages may be driven independently. The moving mechanism 27 is connected to an operation unit (not shown) including a joy-stick that can be tilted along a cross. As the operator operates the joy-stick, a signal representing the degree and direction of the tilted joy-stick is transmitted to the moving mechanism 27. Upon receiving the signal, the moving mechanism 27 drives the X- and Y-stages 27a according to the degree and direction of the tilted joy-stick indicated by the signal so that the Pechan prism 24 is moved within the XY-plane. The operation unit (not shown) may alternatively include a track ball to be rotated by the operator to output a signal representing the extent and direction of rotation of the track ball. Still alternatively, the operation unit may include a lever for the X-direction and a lever for the Y-direction to output a signal representing the extent and direction of each of the tilted levers.

As the Pechan prism 24 is moved within the XY-plane from the initial position, the optical axis Ax of the objective optical system after exiting from the Pechan prism 24 is shifted relative to the optical axis of the first image re-forming optical system 26. FIG. 2 schematically illustrates how the optical axis Ax of the objective optical system is shifted relative to the optical axis of the first image re-forming optical system through the Pechan prism 24. As shown in FIG. 2, when the optical axis Ax before entering the Pechan prism 24 being at its initial position shifts positively in the X-direction (leftward in FIG. 2) by distance w relative to the side surface 242a, the optical axis Ax after exiting from the Pechan prism 24 is moved negatively in the X-direction also by distance w relative to the side surface 241e. That corresponds to the case where the Pechan prism 24 moves negatively in the X-direction (rightward in FIG. 2) by distance w relative to the stationary optical axis Ax of the objective optical system before entering the Pechan prism 24. Therefore, in that case, the optical axis Ax' of the objective optical system after exiting from the Pechan prism 24 is shifted negatively in the X-direction by distance 2w relative to the optical axis Ax' of the objective optical system before entering the Pechan prism 24. Inversely, when the Pechan prism 24 is moved positively in the X-direction, the optical axis Ax of the objective optical system after going out of the Pechan prism 24 is shifted positively in the X-direction by a distance twice as long as the distance of movement of the Pechan prism 24. Similarly, when the Pechan prism 24 is moved in the Y-direction (vertical direction in FIG. 2), the optical axis Ax" of the objective optical system after exiting from the Pechan prism 24 is shifted relative to the optical axis Ax" before entering the Pechan prism 24 in the direction of movement of the Pechan prism 24 by a distance twice as long as the distance of movement of the Pechan prism 24.

Figure 3:
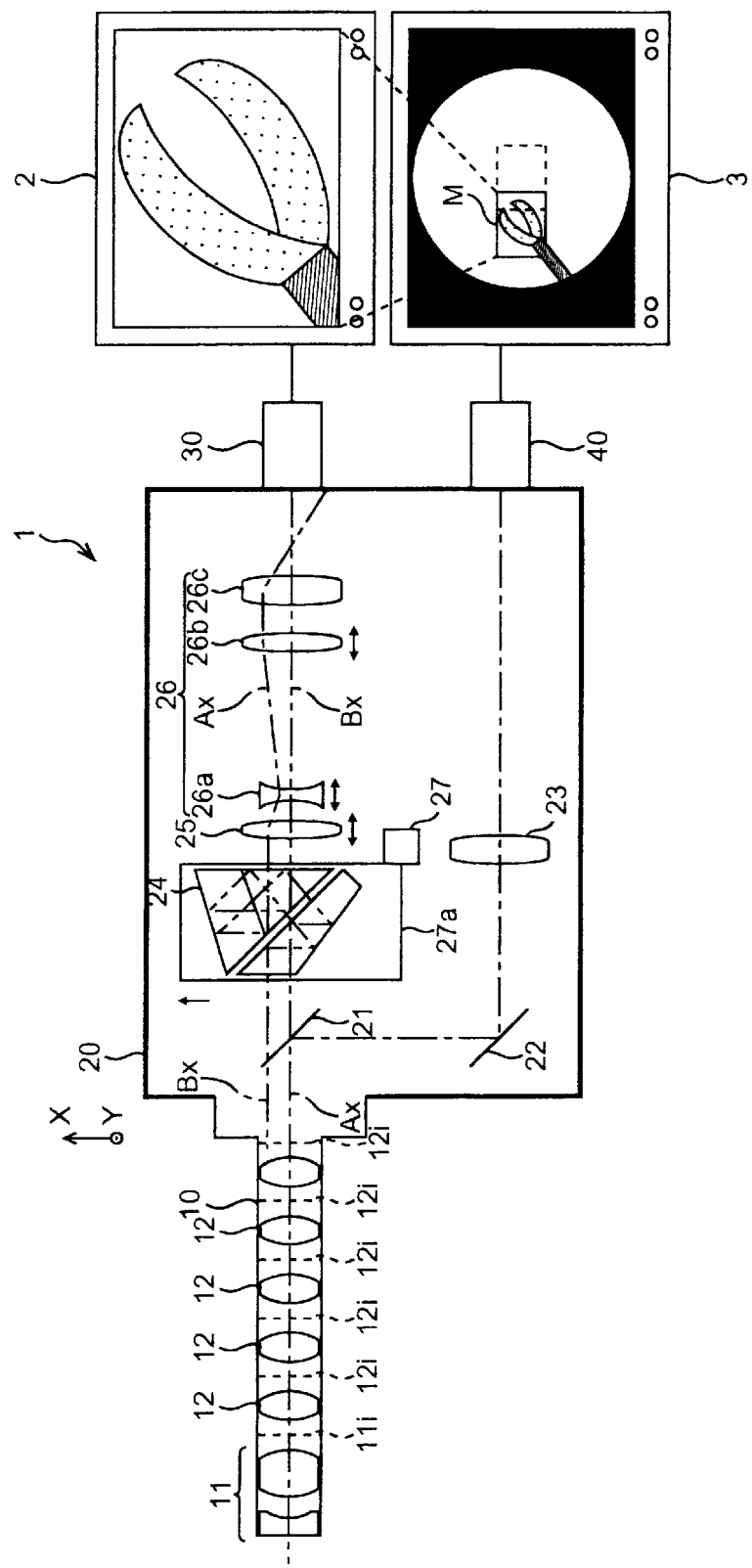
FIG. 3 is a schematic illustration of the optical axis of an objective optical system when the Pechan prism is moved positively in the X-direction.

Thus, as the Pechan prism 24 is shifted within the XY-plane, the optical axis Ax" of the objective optical system after exiting from the Pechan prism 24 is shifted from a line coaxial with the optical axis Bx of the first image re-forming optical system 26. FIG. 3 schematically illustrates how the optical axis Ax of the objective optical system shifts when the Pechan prism is moved. If the Pechan prism 24 is at its initial position where the optical axis Ax of the objective optical system after exiting from the Pechan prism 24 is coaxial with the optical axis Bx of the first image re-forming optical system 26, a light beam traveling on the optical axis Ax of the objective optical system travels on the optical axis Bx of the first image re-forming optical system 26 and enters the center of the imaging surface of the first CCD camera 30. However, as the Pechan prism 24 is moved within the XY-plane as shown in FIG. 3, the optical axis Ax after exiting from the Pechan prism 24 is shifted from the optical axis Bx of the first image re-forming optical system 26. Thus, the light beam traveling on the optical axis Ax of the objective optical system is shifted from the optical axis Bx of the first image re-forming optical system 26 and enters the imaging surface of the first CCD camera 30 at a position shifted from the center thereof, so that the area of the image picked up by the first CCD camera 30 shifts. FIG. 1 shows a case where an area decentered from the center of the image displayed on the screen of the second monitor 3 is enlarged with a predetermined magnification and displayed on the screen of the first monitor 2 through the Pechan prism 24 which is displaced from its initial position. In FIG. 1, the broken lines in the image on the screen of the second monitor 3 indicates an area picked up by the first CCD camera 30 when the Pechan prism 24 is at its initial position.

The objective optical system of the rigid endoscope 10 has a wide field of view and, at the same time shows a large curvature field because the image formed by the objective lens group 11 is relayed through the relay lenses 12. Therefore, as the image formed through the objective optical system is moved in the X- and Y-directions relative to the visual field of the first image re-forming optical system 26, the image will also be moved toward and away on the optical axis Bx from a plane conjugate to the image pickup surface of the first CCD camera 30 with respect to the first image re-forming optical system 26, which may cause defocus on the image picked up by the first CCD camera 30. However, this problem can be solved by using a focusing control circuit (not shown) to drive the focusing actuator in synchronism with the moving mechanism 27 according to the distance by which the optical axis Ax of the objective optical system is shifted from the optical axis Bx of the first image re-forming optical system 26 so that the plane conjugate to the image pickup surface of the first CCD camera 30 with respect to the first image re-forming optical system 26 and the image plane of the objective optical system may intersect on the optical axis Bx.

As described above in detail, with the endoscopic apparatus 1 according to the first embodiment the Pechan prism 24 functioning as an image erecting optical system is arranged between the objective optical system and the first image re-forming optical system 26 of which optical axes are arranged in parallel with each other, movably within the XY-plane that is perpendicular to the optical axes, so that the image formed by the objective optical system can be relatively shifted in parallel with visual field of the first image re-forming optical system 26 and hence the image pickup surface of the first CCD camera 30. Thus, the image formed by the first image re-forming optical system 26 can be picked up by the first CCD camera 30, without decentering aberration, inclination relative to a plane perpendicular to the optical axis of the first image re-forming optical system 26, nor image rotation.

The endoscopic apparatus 1 according to the first embodiment may be modified in such a way that the Pechan prism 24 is replaced by some other image erecting prism such as an Abbe prism 243 (see FIG. 4) having a roof or a first type Porro prism 244 (see FIG. 5) consisting of two right-angle prisms. Also in those modification, the optical axis Ax after exiting from the Abbe prism 243 or the first type Porro prism 244 is shifted relative to the optical axis Bx of the first image re-forming optical system 26 by moving the Abbe prism 243 or the first type Porro prism 244 within the XY-plane.

Figure 4:
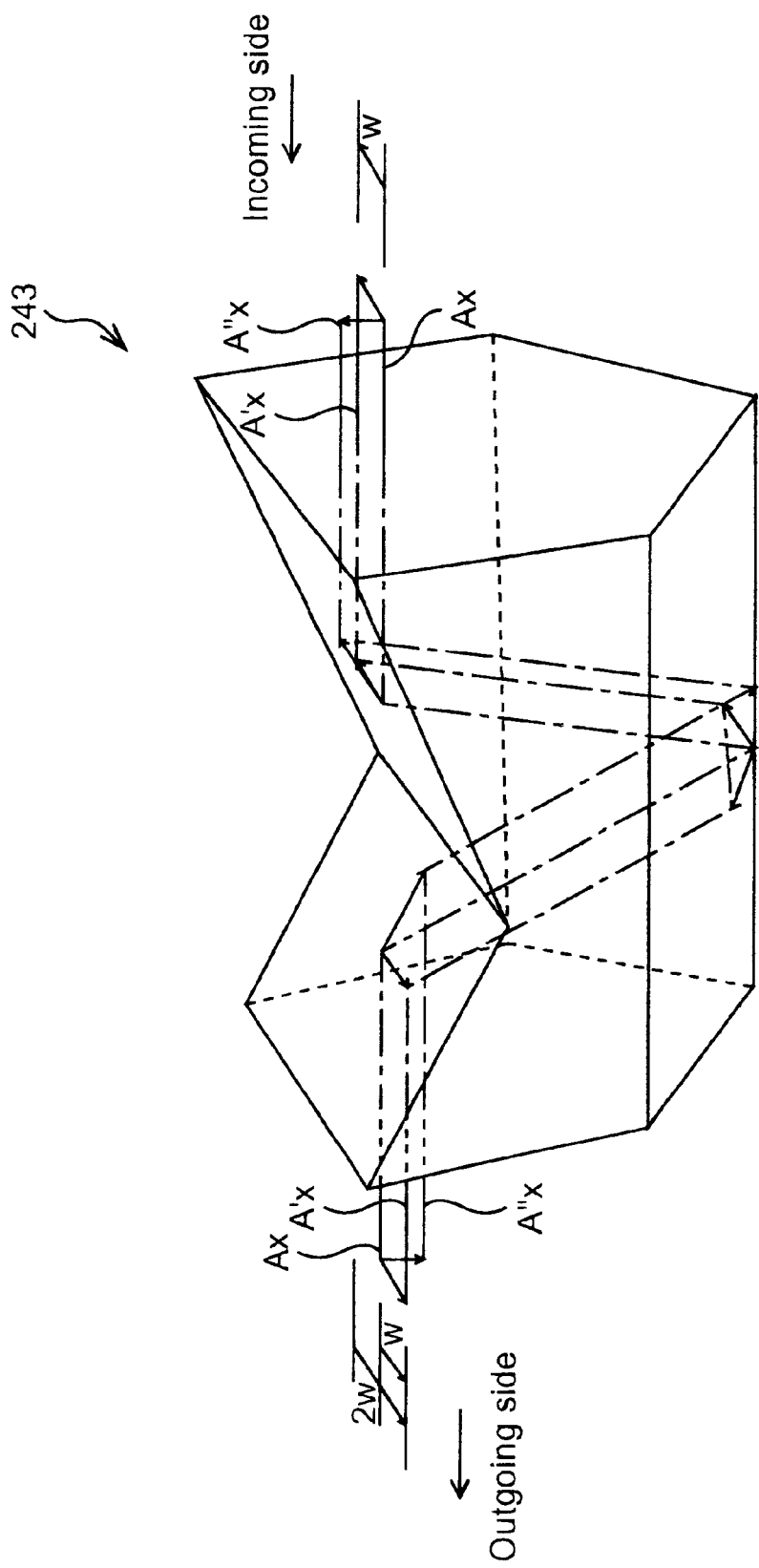
FIG. 4 is a schematic perspective view of an Abbe prism that is used in a variation of the first embodiment.
Figure 5:
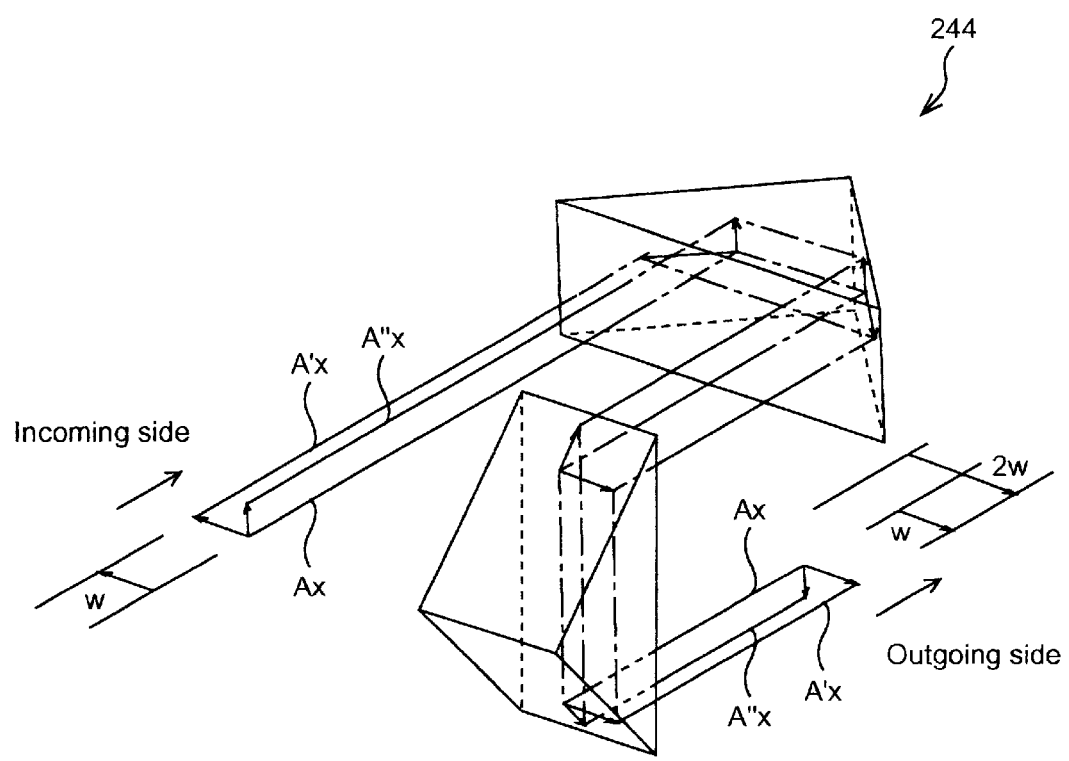
FIG. 5 is a perspective view of a first type Porro prism that is used in another variation of the first embodiment.

More specifically, referring to FIGS. 4 and 5, even in case where either of the prisms 243, 244 is adapted, the optical axis Ax of the objective optical system after going out of the prism 243 or 244, is shifted in the direction in which the prism 243 or 244 is moved. The optical axis Ax is shifted by a distance (2w) twice as long as the distance (w) by which the prism 243 or 244 is moved. Then, the image formed through the objective optical system is relatively shifted with the first image re-forming optical system in the direction of movement of the prism 243 or, so that an area of the image enlarged by the first image re-forming optical system 26 moves on the image pickup surface of the first CCD camera 30 in the direction opposite to the direction of movement of the prism 243 or 244.

It should be noted that, in case a first type Porro prism 244 is used, the optical axis Ax before entering the prism 244 and the optical axis Ax after exiting from the prism 244 are not coaxial. On the contrary, in case a Pechan prism 24 or an Abbe prism 243 is adapted, the optical axis before entering the prism 24 or 243 and the optical axis Ax after exiting from the prism 24 or 243 can be made coaxial, which can make an endoscopic apparatus 1 compact.

Second Embodiment

A second embodiment of image search device according to the invention is incorporated into an endoscopic apparatus 50. The endoscopic apparatus 50 according to the second embodiment is identical with the endoscopic apparatus 1 of the first embodiment except that the Pechan prism 24 is replaced by a second type Porro prism 28 and that the half mirror 21 is replaced by the first reflecting surface of the second type Porro prism 28 functioning as partial reflection surface. An explanation of the components same as those of the endoscopic apparatus 1 of the first embodiment will be omitted hereinafter.

Figure 6:
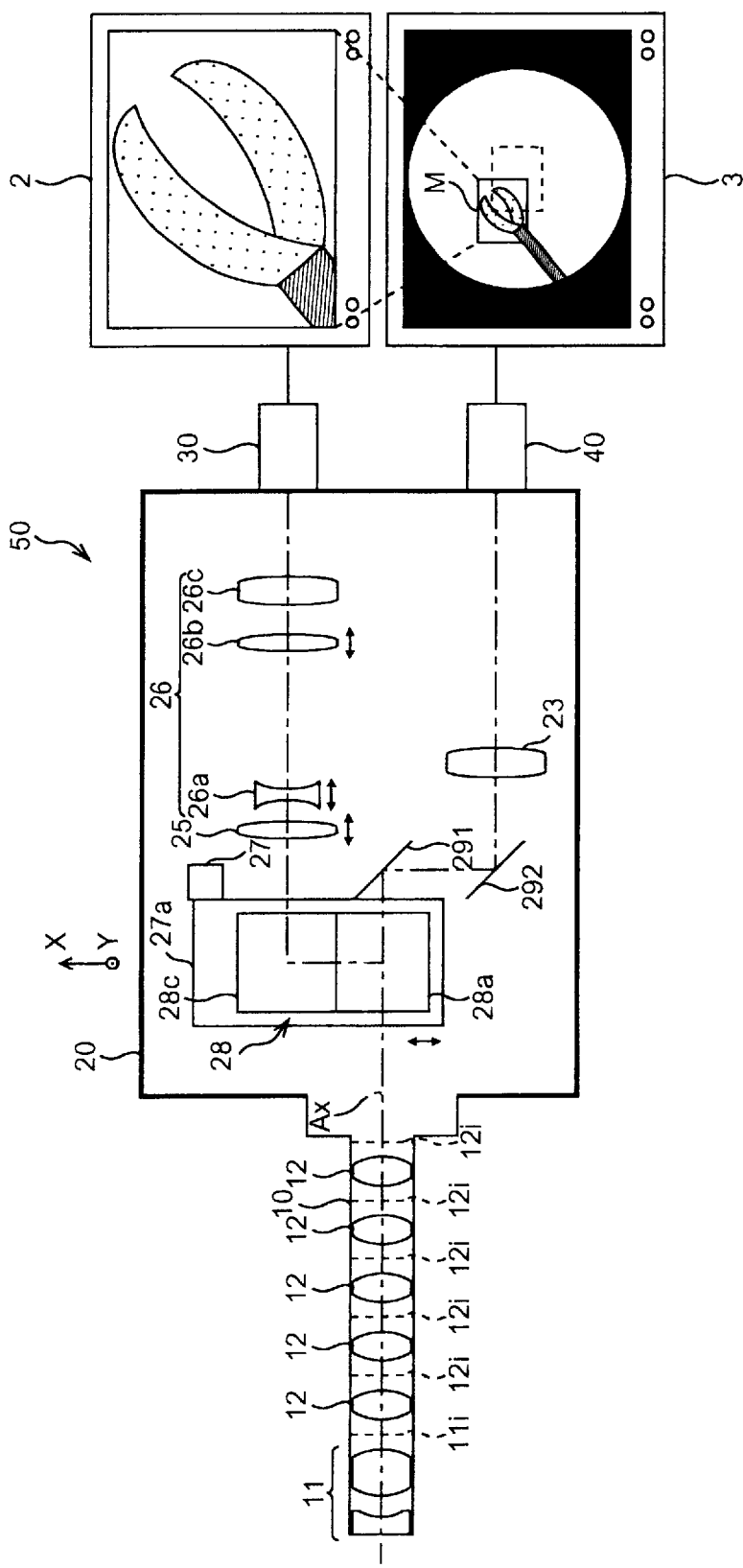
FIG. 6 is a schematic illustration of an optical arrangement and an internal arrangement of an endoscopic apparatus as a second embodiment of the invention.

As shown in FIG. 6, the second type Porro prism 28 is arranged between the objective optical system contained in the rigid endoscope 10 connected to the image separating device 20 and the focusing lens 25. The second type Porro prism 28 consists of a right-angle prism 282, another right-angle prism 283 having a size of about a half of the right-angle prism 282, and a beam splitter 281 as a combination of a pair of right-angle prisms each of which is as large as the right-angle prism 283. The sloped surface of one of the pair right-angle prisms of the beam splitter 281 is coated with metal thin film that is formed by evaporation to reflect visible light with a reflectance of 50%. The beam splitter 281 is made by bonding the sloped surfaces of the paired right-angle prisms so as to have the shape of a rectangular parallelepiped. Thus, the beam splitter 281 reflects part of the light entering thereto by the bonded surfaces and transmit the remaining part thereof.

The beam splitter 281 is arranged behind the rigid endoscope 10. A reflection mirror 291 is arranged on the light path of the object light transmitted through the objective optical system in the rigid endoscope 10 and transmitted through the beam splitter 281. The optical axis Ax of the objective optical system passing through the beam splitter 281 is sequentially bent by the reflection mirror 291 and another reflection mirror 292, proceeds along the optical axis of the second image re-forming optical system 23 and strikes the center of the image pickup surface of the second CCD camera 40. The image formed by the objective optical system is re-formed on the imaging surface of the second CCD camera 40 through the second image re-forming optical system 23.

Figure 7:
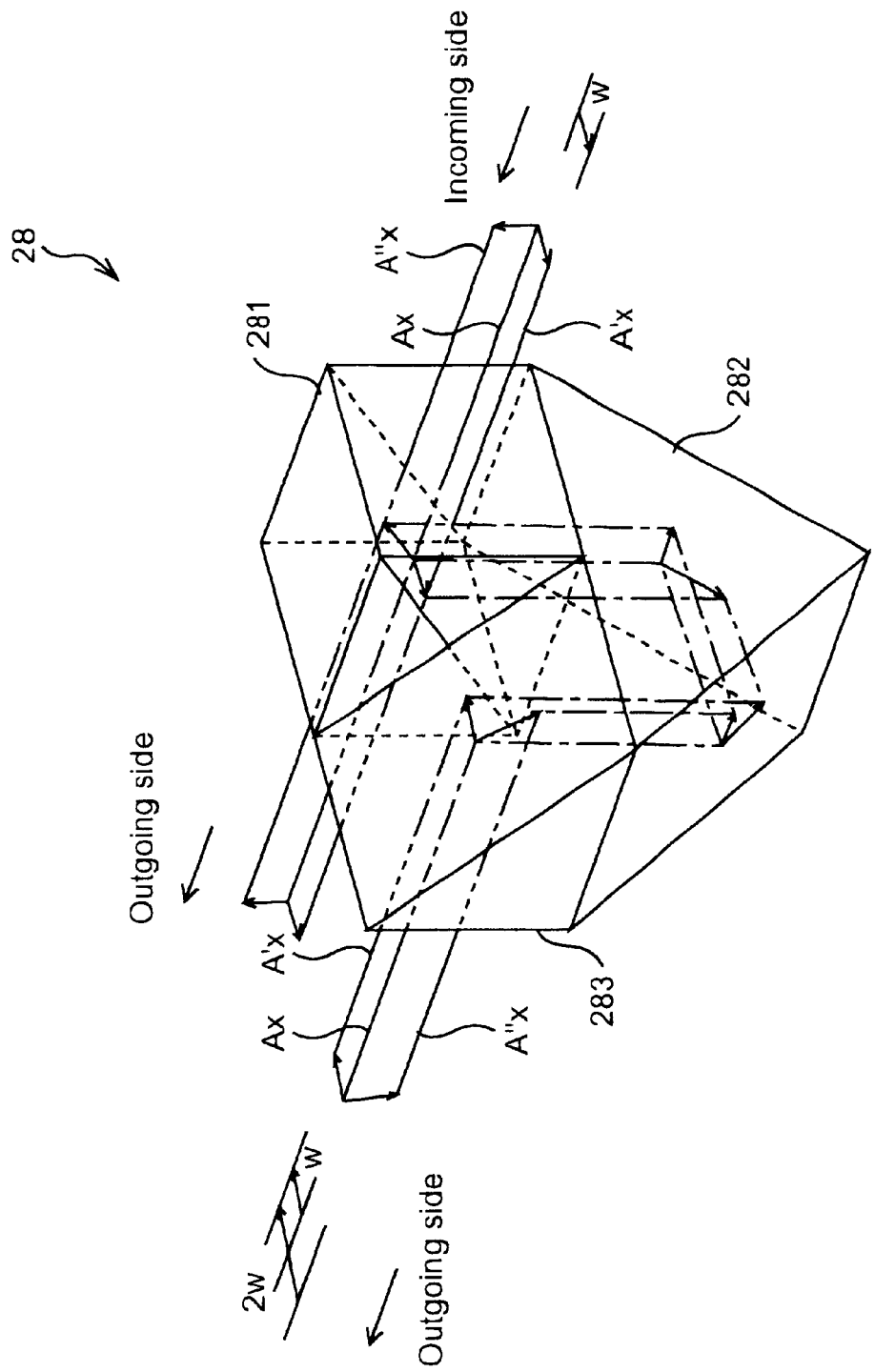
FIG. 7 is an enlarged perspective view of a second type Porro prism that is used in the second embodiment.

On the other hand, the optical axis Ax of the objective optical system is split and bent perpendicularly by the reflecting surface of the beam splitter 281. Then, the axis Ax led into the right-angle prism 282 along the Y-direction (that is, the direction perpendicular to the surface of FIG. 7) bent twice by the inner surfaces of the second and third reflecting surfaces of the second type Porro prism, which are intersecting perpendicular to each other, and deflected by 180° within a plane perpendicular to the optical axis Ax so as to led into the rectangular prism 283. The optical axis Ax perpendicularly bent by the inner surface of a sloped surface of the rectangular prism 283 (fourth reflecting surface of the second type Porro prism) is then made parallel with the optical axis Ax before entering the beam splitter 281. Note that, when the second type Porro prism 28 is at its initial position, the optical axis Ax of the objective optical system after exiting from the second type Porro prism 28 is coaxial with the optical axis of the focusing lens 25 and the first image re-forming optical system 26 and strikes the center of the image pickup surface of the first CCD camera 30.

The second type Porro prism 28 can be moved within the XY-plane by the X- and Y-stages 27a that are driven by a moving mechanism 27. When the second type Porro prism 28 is moved negatively in the X-direction (rightward in FIG. 7) by distance w relative to the optical axis Ax of the objective optical system as shown in the perspective view of FIG. 7, the optical axis Ax' of the objective optical system after exiting from the second type Porro prism 28 is shifted negatively in the X-direction by distance 2w from the optical axis Ax' before entering the second type Porro prism 28. Inversely, when the second type Porro prism 28 is moved positively in the X-direction, the optical axis Ax of the objective optical system after exiting from the second type Porro prism 28 is shifted positively in the X-direction by a distance twice as long as the distance of movement of the second type Porro prism 28. Similarly, when the second type Porro prism 28 is moved in the Y-direction (vertical direction in FIG. 7), the optical axis Ax" of the objective optical system after exiting from the second type Porro prism 28 is shifted from the optical axis Ax" before entering the second type Porro prism 28 in the direction of movement of the second type Porro prism 28 by a distance twice as long as the distance of movement of the second type Porro prism 28.

Thus, as the second type Porro prism 28 is shifted within the XY-plane, the optical axis Ax of the objective optical system is shifted from a line coaxial with the optical axis Bx of the first image re-forming optical system 26. As in the case of the endoscopic apparatus 1 of the first embodiment, the image formed on the plane containing the imaging surface of the first CCD camera 30 through the first image re-forming optical system 26 shifts relatively to the first image re-forming optical system 26 by a distance corresponding to the distance of shift of the optical axis Ax from the optical axis Bx in a direction opposite to that of the shift of the second type Porro prism 28. At this time, the image formed by the objective optical system observed through the second type Porro prism 28 is moved relatively in the direction of movement of the second type Porro prism 28.

As described above, with the endoscopic apparatus 50 according to the second embodiment, the second type Porro prism 28 functioning as an image erecting optical system is shifted in parallel within the XY-plane that is perpendicular to the optical axis Ax, so that the image formed through the objective optical system can be relatively shifted with the visual field of the first image re-forming optical system 26 and hence the image pickup surface of the first CCD camera 30. Thus, the image formed by the first image re-forming optical system 26 can be picked up by the first CCD camera 30, without decentering aberration, inclination relative to a plane perpendicular to the optical axis of the first image re-forming optical system 26, nor image rotation about the optical axis.

Third Embodiment

Figure 8:
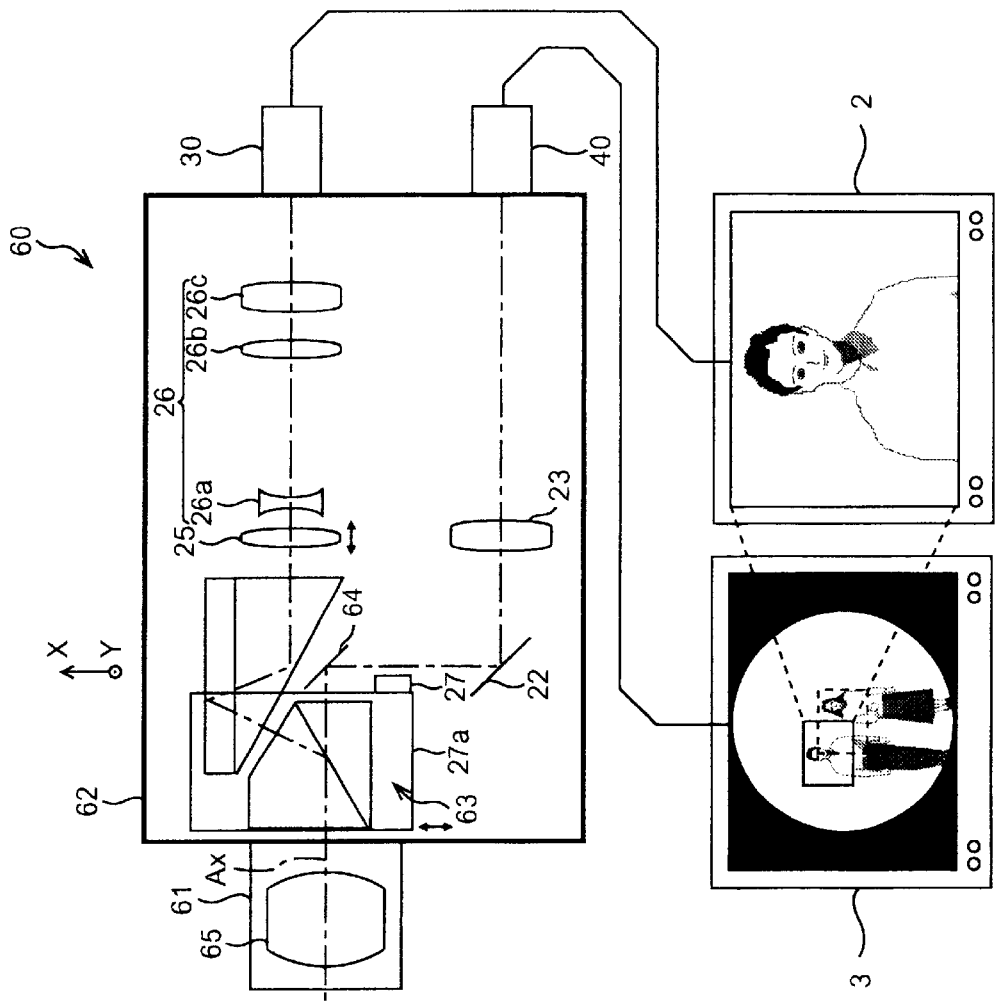
FIG. 8 is a schematic illustration of an optical arrangement and an internal arrangement of a surveillance camera as a third embodiment of the invention.

A third embodiment of the image search device according to the invention is incorporated into a surveillance camera 60. Referring to FIG. 8, the surveillance camera 60 has a main body 62 that corresponds to the image separating device 20 in the first embodiment, a lens barrel 61 mounted in front of the main body 62 and first and second CCD cameras 30, 40 functioning as image pickup devices mounted to the rear of the main body 62. As clearly shown in FIGS. 1 and 8, the arrangement of the surveillance camera 60 of the third embodiment is substantially similar to that of the endoscopic apparatus 1 of the first embodiment. Therefore, the components similar to those of the endoscopic apparatus 1 of the first embodiment are respectively denoted by the same reference number and their explanations are omitted.

The lens barrel 61 contains an objective optical system 65 having a wide view angle of about 120°. The image of the space to be monitored is formed through the objective optical system 65.

The main body 62 contains therein an Abbe prism 63 having a roof, a reflection mirror 64, another reflection mirror 22, a focusing lens 25, a first image re-forming optical system 26 and a second image re-forming optical system 23.

Figure 9:
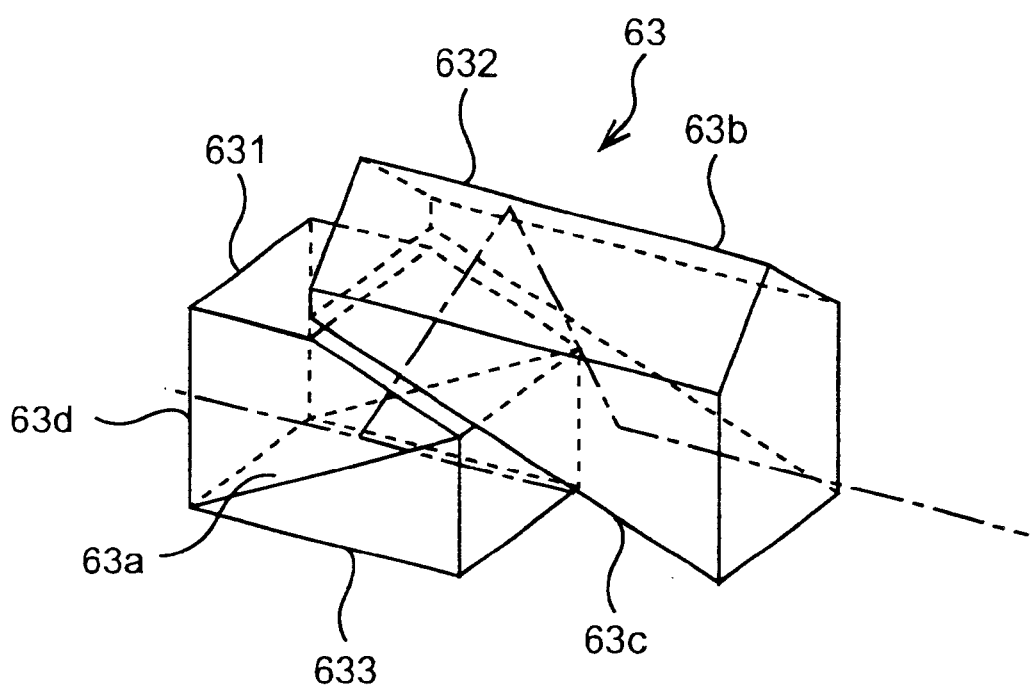
FIG. 9 is an enlarged perspective view of an Abbe prism that is used in the third embodiment.

The Abbe prism 63 functioning as an image erecting optical system is held on the light path of the object light in such a way that it can be shifted in the X-direction that is perpendicular to the optical axis Ax of the objective optical system 65 and also in the Y-direction that is perpendicular to both the X-direction and the optical axis Ax. FIG. 9 is an enlarged perspective view of the Abbe prism 63. As seen from FIGS. 8 and 9, the Abbe prism 63 of this embodiment has a structure somewhat different from the basic structure of the Abbe prism 243 shown in FIG. 4. More specifically, the Abbe prism 63 basically has a first reflection surface 63a adapted to bend the optical axis Ax of the objective optical system 65 entering it perpendicularly through the incident surface 63d by an angle of 120°, a second reflection surface 63b formed as a roof having a ridge parallel with the optical axis Ax passing through the incident surface 63d and adapted to further bend the optical axis Ax that has been bent by the first reflection surface 63a, and a third reflection surface 63c adapted to further bend the optical axis Ax that has been bent by the second reflection surface 63b by an angle of 120° to the direction parallel with the optical axis Ax passing through the incident surface 63d. Note that the Abbe prism 63 is separated into a first prism 631 having the first reflection surface 63a and a second prism 632 having the second and third reflection surfaces 63b, 63c for the convenience of manufacturing, along the third reflection surface 63c. The first reflection surface 63a of the first prism 631 is a partial reflection surface and bonded to a triangular prism 633 to form a beam splitter.

In this embodiment, the optical axis of the focusing lens 25 and the first image re-forming optical system 26 is offset in the X-direction (vertical direction in FIG. 8) from the optical axis Ax of the objective optical system 65. The position of the Abbe prism 63 where the optical axis Ax of the objective optical system 65 that has been bent by the Abbe prism 63 coincides with the optical axis of the focusing lens 25 and the first image re-forming optical system 26 is referred to as an initial position hereinafter.

With the above described arrangement, the object light transmitted through the objective optical system 65 is then sequentially transmitted through the Abbe prism 63, the focusing lens 25, and the first image re-forming optical system 26, and enters the imaging surface of the first CCD camera 30. At this time, the Abbe prism 63 inverts and reverses the image formed by the objective optical system 65 and the first image re-forming optical system 26 enlarges an area of the image with a predetermined magnification and to re-form it on the imaging surface of the first CCD camera 30. Then, the image re-formed by the first image re-forming optical system 26 is picked up by the first CCD camera 30 and displayed on the display screen of the first monitor 2 that is connected to the first CCD camera 30.

The Abbe prism 63 is adapted to move as a whole within the XY-plane as the X- and Y-stages 27a are driven by a moving mechanism 27. As the Abbe prism 63 is moved from the initial position in X- and/or Y-directions, the optical axis Ax of the objective optical system 65 after exiting from the Abbe prism 63 is shifted from the optical axis of the first image re-forming optical system 26 in the direction of movement of the Abbe prism 63 by a distance twice as long as the distance of movement of the Abbe prism 63. FIG. 8 schematically illustrates a case where an area decentered from the center of the image displayed on the screen of the second monitor 3 is enlarged with a predetermined magnification and displayed on the screen of the first monitor 2 through the Abbe prism 63 which is displaced from its initial position. In FIG. 8, the broken lines in the image on the screen of the second monitor 3 indicates area picked up by the first CCD camera 30 when the Abbe prism 63 is at its initial position.

The reflection mirror 64 is arranged on the optical path of the object light transmitted through the first reflection surface 63a of the Abbe prism 63 in order to bend the optical axis Ax of the objective optical system 65 separated by the first reflection surface 63a by 90°. Another reflection mirror 22 is arranged on the optical path of the object light reflected by the reflection mirror 64. Thus, the optical axis Ax of the objective optical system 65 is further bent by the reflection mirror 22, coaxially passes through the second image re-forming optical system 23 and perpendicularly enters the center of the image pickup surface of the second CCD camera.

With the above described arrangement, the object light that has passed through the first reflection surface 63a is sequentially reflected by the two reflection mirrors 64, 22, passes through the second image re-forming optical system 23 and enters the imaging surface of the second CCD camera 40. The second CCD camera 40 picks up the image formed by the objective optical system 65 and relayed through the second image re-forming optical system 23. The picked up image is then displayed on the display screen of the second monitor 3 connected to the second CCD camera 40.

As described above in detail, in the surveillance camera 60 according to the third embodiment, the Abbe prism 63 functioning as an image erecting optical system is arranged between the objective optical system 65 and the first image re-forming optical system 26 whose optical axes are arranged in parallel with each other, movably within the XY-plane that is perpendicular to the optical axes, so that the image formed through the objective optical system 65 can be relatively shifted in parallel to the visual field of the first image re-forming system 26, namely, the image pickup surface of the first CCD camera 30. Therefore, the image formed by the first image re-forming optical system 26 can be picked up by the first CCD camera 30, without decentering aberration, inclination relative to a direction perpendicular to the optical axis of the first image re-forming optical system 26, nor rotation about the optical axis.

As described above, an image search device according to present invention makes it possible to search and detect any target area in the image formed by the objective optical system. Thus, the image can be shifted relatively to the optical axis of the first image re-forming optical system in a plane perpendicular to the optical axis, without any decentering aberration, inclination nor rotation.

I claim:

1. An image search device comprising:
an objective optical system which forms an image of an object;
an image erecting optical system having at least four reflection surfaces;
a first image re-forming optical system to which object light having passed through said objective optical system and said image erecting optical system enters and which re-forms the image from the object light; and
a drive mechanism which moves said image erecting optical system in a direction perpendicular to an optical axis of said objective optical system to shift the optical axis of the objective optical system relative to the optical axis of the first image re-forming optical system.

2. The image search device according to claim 1, wherein said reflection surfaces of said image erecting optical system include two pairs of reflection surfaces, each pair of said reflection surfaces inclining to each other; and
said two pairs of reflection surfaces are arranged such that a line of intersection of extensions of one of the pairs of reflection surfaces is directed perpendicularly to a line of intersections of extensions of the other pair of reflection surfaces.

3. The image search device according to claim 1, wherein said first image re-forming optical system includes a variator movable along the optical axis.

4. The image search device according to claim 1, further comprising:
a focusing lens arranged between said image erecting optical system and said first image re-forming optical system movable along the optical axis of said first image re-forming optical system.

5. The image search device according to claim 1, further comprising:
an image pickup device which picks up an image formed through said first image re-forming optical system.

6. The image search device according to claim 1, further comprising:
a separating optical member which reflects a part of the object light having passed through said objective optical system and transmits the remaining part thereof; and
a second image re-forming optical system to which said object light separated by said separating optical member enters and which re-forms the image from said object light.

7. The image search device according to claim 6, further comprising:
a first image pickup device which picks up an image formed through said first image re-forming optical system; and
a second image pickup device which picks up an image formed through said second image re-forming optical system.

8. The image search device according to claim 1, wherein said image erecting optical system is a Pechan prism having a roof.

9. The image search device according to claim 1, wherein said image erecting optical system is an Abbe prism having a roof.

10. The image search device according to claim 1, wherein said image erecting optical system is a first type Porro prism.

11. The image search device according to claim 1, wherein said image erecting optical system is a second type Porro prism.

12. The image search device according to claim 6, wherein a first reflection surface, which is foremost among the four reflection surfaces of said image erecting optical system respectively arranged at positions equivalent to those of a second type Porro prism, is made as said separating member.

13. The image search device according to claim 12, further comprising:

a first image pickup device which picks up an image formed through said first image re-forming optical system; and a second image pickup device which picks up an image formed through said second image re-forming optical system.

14. The image search device according to claim 1, wherein said objective optical system has a visual field of 120° or more.

15. The image search device according to claim 1, wherein said objective optical system is contained in an endoscope.

16. The image search device according to claim 1, wherein said objective optical system is contained in a surveillance camera.

17. The image search device according to claim 1, wherein said first image re-forming optical system re-forms the image as a real image.

* * * * *